US012674074B2

(12) United States Patent     (10) Patent No.:   US 12,674,074 B2

Selwyn     (45) Date of Patent:    Jul. 7, 2026

(54) DURABLE WATER-REPELLENT TREATMENT FOR SYNTHETICS AND NATURAL FIBERS

(71) Applicant: Gary S. Selwyn, Albuquerque, NM (US)

(72) Inventor: Gary S. Selwyn, Albuquerque, NM (US)

( * ) Notice: Subject to any disclaimer, the term of this patent is extended or adjusted under 35 U.S.C. 154(b) by 247 days.

(21) Appl. No.: 18/661,888

(22) Filed: May 13, 2024

(65) Prior Publication Data

US 2024/0392161 A1     Nov. 28, 2024

Related U.S. Application Data

(60) Provisional application No. 63/468,312, filed on May 23, 2023.

(51) Int. Cl.

| | |
|---|---|
| *C09D 191/00* | (2006.01) |
| *C09D 5/02* | (2006.01) |
| *C09D 7/20* | (2018.01) |
| *C09D 7/63* | (2018.01) |
| *D06M 13/328* | (2006.01) |
| *D06M 15/17* | (2006.01) |
| *D06M 15/643* | (2006.01) |
| *D06M 15/71* | (2006.01) |

(52) U.S. Cl.

CPC ......... *C09D 191/005* (2013.01); *C09D 5/022* (2013.01); *C09D 5/028* (2013.01); *C09D 7/20* (2018.01); *C09D 7/63* (2018.01); *D06M*

*13/328* (2013.01); *D06M 15/17* (2013.01); *D06M 15/643* (2013.01); *D06M 15/71* (2013.01)

(58) Field of Classification Search

CPC .................................................. C09D 191/005

See application file for complete search history.

(56) References Cited

U.S. PATENT DOCUMENTS

| | | | | |
|---|---|---|---|---|
| 4,681,910 | A * | 7/1987 | Crockatt | .............. C09D 133/06 |
| | | | | 524/487 |
| 6,528,576 | B1 * | 3/2003 | Meier | ................. D06M 13/224 |
| | | | | 524/591 |
| 9,790,640 | B2 | 10/2017 | Selwyn | |
| 9,902,874 | B2 | 2/2018 | Selwyn | |
| 10,655,272 | B2 | 5/2020 | Selwyn | |
| 10,919,647 | B2 | 2/2021 | Selwyn | |
| 11,377,789 | B2 | 7/2022 | Selwyn | |
| 2003/0192130 | A1 * | 10/2003 | Kaaret | ................ D06M 13/236 |
| | | | | 8/115.51 |
| 2017/0355806 | A1 * | 12/2017 | Zhou | ........................ C08K 5/17 |

* cited by examiner

*Primary Examiner* — Andrew T Piziali

(57) ABSTRACT

Aqueous-based coating compositions include a drying oil, a fatty acid or alkylamine fatty acid, and alkyl amine, 50-90% water and one or more waxes. When applied to a fabric and cured in air, the compositions form water repellent coatings that are laundry durable. A dye may be included in the coating composition; in such cases a durable water-repellent coating is applied to the fabric and the fabric is dyed in a single curing step.

20 Claims, No Drawings

DURABLE WATER-REPELLENT TREATMENT FOR SYNTHETICS AND NATURAL FIBERS

Textiles are commonly finished at mills with dyes and various polymeric treatments for color, improved durability, comfort and feel, and to provide water repellency for outdoor and sports apparel. One such finishing step is the addition of a durable, water repellent (DWR) treatment. For many years, a perfluorochemical polymer treatment was applied to dyed fabric, using an aqueous bath and a continuous curing oven. This finishing process provides water and limited stain repellency to the fabric prior to it being sewn into garments.

Following the banning of certain long chain, perfluoroalkyl substances (PFAS) by the US EPA in 2012, consumer preference for safe chemistry applied to apparel, carpets, medical personal protection equipment (PPE) and other textile surfaces has sharply increased, and the industry has searched for alternatives to the banned PFAS-based chemistry. Some shorter chain PFAS chemicals are still permitted in certain jurisdictions, though these have not proven as effective at either water repellency, laundry durability or stain repellency. New, fluorochemical-free DWR treatments have also become available with similar shortcomings.

Most often, the DWR processing step is done as a second finishing process after dyeing, because the chemistry required for dyeing and that for DWR are, in many cases, incompatible and because the DWR treatment interferes with any subsequent water-based dyeing of the fabric. Dyeing and DWR fabric treatment have always been done as separate steps even though the two finishing processes influence the other's properties on the fabric. For example, the DWR treatment often changes the shade or color of the dyed fabric. Also, to make the dyeing process more efficient, hydrophilic chemicals are often added to a dye bath to improve dye pickup. These dye additives affect the water repellency of any subsequent DWR treatment.

Fabric dyeing is a major aspect of textile and apparel production and one of the key steps required for any garment manufacturing process. Fabric dyeing is one of the most demanding processes in textile production due to brand and customer desire to have vibrant colors that not only are uniform across the entire width of the fabric (which may be 1.2 to 1.8 m), but also are uniform for hundreds or even thousands of meters in length.

Many commercial dyes are specific for certain fabrics. By way of example, disperse dyes are exclusively used for polyester fabric, acid dyes are commonly used for polyamides and reactive dyes are used for cotton and certain other natural fibers.

Traditionally, the dyeing process is done using an aqueous solution. One commonly used fabric dyeing process is "beck" dyeing, a batch process in which large quantities of full width fabric are internally circulated for 6 to 8 hours in superheated, pressurized water containing the dissolved dyestuff and various dye-enhancing chemicals, followed by rinsing, neutralization, drying and curing.

Another common dyeing process is thermosol dyeing, which is a continuous process that also takes hours and involves steaming the fabric in various thermal sections, followed by several rinsing and neutralization processes.

Cotton dyeing also involves soaping, high temperature washing and is followed by rinsing, neutralization, drying and curing.

All of these conventional dyeing processes involve large quantities of water and consume several hours of process time. Much of the water pollution generated by the mills comes from the dyeing process because of the water that is circulated through the fabric and the multiple rinse steps needed to eliminate the excess dye and any residual soap or dye additives. Additionally, most of the energy consumption of a mill comes from heating all the water required for dyeing. Reduction of the energy budget for water heating is necessary for the industry to meet its greenhouse gas reduction targets.

A highly performing DWR fabric-treating process that avoids PFAS chemicals and is easily applied and cured, using reduced amounts of energy, would be highly desirable. It would be further desirable if such the coating composition used in such a process largely comprised products obtainable from renewable resources, in particular agrichemicals derived from plants or trees.

Additionally, a process that would allow DWR treatment and fabric dyeing to be performed simultaneously, in a single coating and curing step, would have much value to the industry and would reduce energy use and costs and operational complexity for textile mills. Also, by eliminating the dye additives used to improve dye pickup by the fabric, the amount of water waste can be greatly reduced. For use in apparel, the DWR and fabric dyeing process would also have to have durability to withstand multiple washing cycles.

This invention is a coating composition in the form of an emulsion. The coating composition comprises, based on the total weight of the composition, a) 5 to 35 wt-% of a drying oil;

b) 0.25 to 5 wt.-% of a fatty acid or fatty alcohol component selected from the group consisting of (i) fatty acids having at least 12 carbon atoms and 0 to 2 non-conjugated carbon-carbon double bonds, (ii) alkylamine fatty acids having in the fatty acid portion at least 12 carbon atoms and 0 to 2 non-conjugated carbon-carbon double bonds and (iii) fatty alcohols having at least 12 carbon atoms and 0 to 2 non-conjugated carbon-carbon double bonds;

c) 2 to 10 wt.-% of an alkylamine having a boiling temperature of 75 to 160° C., provided the amount of alkylamine is 0.2 to 1.25 parts by weight per part by weight of the drying oil;

d) 50 to 90 wt.-% water; and e) 0.25 to 7.5 wt.-% of a wax or mixture of waxes, the wax or mixture of waxes having a melting temperature of at least 60° C.

The invention is also a process for applying a DWR finish to a fabric, comprising the steps of (a) applying a coating composition of the invention to a fabric and (b) curing the applied coating composition in air at a temperature of 100 to 160° C. to produce the DWR finish.

The coating composition is useful for applying a DWR finish to a wide range of fabrics, including cotton, wool, bamboo, linen, silk, polyester, precipitated cellulose (Lyocell, Tencel®), polyolefin, polyamide, acrylic (Orlon™), polylactic acid, aramids and polyether-polyurea (Elastane®, Spandex, Lycra® for example), as well as blends of two or more of these fibers and synthetic derivatives of natural biofibers, such as banana stems, wheat and rice straw, hemp, jute, abacá, corn and pineapple. The coating composition typically is in the form of an oil-in-water emulsion, though water-in-oil emulsions may also be possible. The fabric can be submerged or pulled through the emulsion, then squeezed out between nip rollers to remove excess liquor (a process known in the trade as "padding") and continuously dried and cured in an oven or other heater. At the end of the curing process, the DWR treatment is complete and requires no additional processing or rinsing. The curing step is done in air and is clearly differentiated from certain free radical polymerization processes that must be done in an oxygen-free environment. As such, the coating and curing steps do not require specialized capital equipment or any industrial gases. It uses equipment of the type already present in most textile mills. Many of the components of the coating composition may be agrichemical products such as natural plant products (such as the drying oil and waxes) or derivatives of natural plant or animal products (such as the fatty acid or fatty alcohol component and many of the waxes). These agrichemical products are also biodegradable, which meets another of the textile industry's sustainability goals.

The coating composition of the invention requires no fluorocarbons, so adhesion of icons and membranes to the treated fabric is simple. The treated fabric has a pleasant, dry feel. The DWR treatment often improves the durability of the product by minimizing fiber breakage and microfiber release during use and laundering.

This DWR process may be used on previously dyed or undyed fabric. However, another important advantage of this invention is that a dye or pigment may be included in the coating composition; doing so permits dyeing and application of the DWR finish to be performed simultaneously, in a single processing operation, thereby reducing the mills' operational and energy costs. The oils and fatty acid or fatty alcohol components are believed to improve the penetration of the emulsion chemistry into both synthetics and natural fibers, carrying the dyestuff into the fibers and, upon curing, anchoring the dyestuffs into the fiber and eliminating hours of operational time. Any number of dye types may be used: acid dyes, pigment dyes, reactive dyes or disperse dyes; and in most cases, the fabric will be accordingly permanently colored, while also having the desired DWR attributes. This is highly appealing, as it reduces the operational complexity for dyehouses because it allows a wider range of dyes to be used to treat specific fabrics and it simplifies the dyeing of fabrics having blended fibers, such as cotton/polyester or polyester/elastane blends. It is, by way of example, possible to obtain a colorfast dye on polyester using reactive dyes normally used for cotton, instead of only disperse dyes. Acid or direct dyes, normally used for polyamide fabrics, may also be used for cotton or linen and dyes of one type may be mixed with other types of dyes.

Component a) of the coating composition is a drying oil. By "drying oil" it is meant a fatty acid triglyceride that crosslinks after a period of exposure to air. At least one of the constituent fatty acids of the fatty acid triglyceride has at least one, preferably at least two, carbon-carbon double bonds. In some embodiments, at least one constituent fatty acid has at least three carbon-carbon double bonds. The drying oil preferably has an iodine value greater than 130.

Multiple carbon-carbon double bonds of such a constituent fatty acid may be conjugated or non-conjugated; however, drying oils having at least one constituent fatty acid that contains at least 2 (as in linoleic acid, for example), preferably 3, conjugated carbon-carbon double bonds are particularly useful. In some particularly useful embodiments, at least 40% by weight of the constituent fatty acids of the drying oil contain at least 3 conjugated carbon-carbon double bonds. Examples of constituent fatty acids that have at least 3 conjugated carbon-carbon double bonds include alpha-eleostearic acid and calendic acid. The drying oil may be a raw oil, i.e., one that has not been purified to remove free fatty acids or other organic components. In fact, the use of the raw drying oil may be used as a certification of the safety and the sustainability of the treatment.

Examples of drying oils include linseed oil, sunflower, safflower, poppy seed oil, perilla oil and walnut oil. Examples of especially preferred drying oils include tung oil, bitter gourd oil and pot marigold seed oil, as alpha-eleostearic acid and/or calendic acid constitute 40% or more by weight of the constituent fatty acids of those especially preferred drying oils.

The coating composition contains 5 to 35 wt. % of the drying oil, based on the weight of the coating composition. A preferred amount is at least 6 wt.-% or at least 7 wt.-% and up to 30 wt.-%, up to 25 wt.-% or up to 20 wt.-%, on the same basis. All weight-percentages of the coating composition reported herein are "wet weights", i.e., the total weight of the coating composition including the weight of water and other volatiles that are removed during the cure and do not remain with the cured coating.

The fatty acid or fatty alcohol component (component b) is (i) one or more fatty acids having at least 12 carbon atoms, preferably 12 to 24 carbon atoms and 0 to 2 non-conjugated carbon-carbon double bonds, (ii) one or more alkylamine fatty acids having in the fatty acid portion at least 12, preferably 12 to 24 carbon atoms and 0 to 2 non-conjugated carbon-carbon double bonds, and/or (iii) one or more fatty alcohols having at least 12 carbon atoms, preferably 12 to 24 carbon atoms and 0 to 2 non-conjugated carbon-carbon double bonds. Examples of suitable fatty acids include lauric acid, tridecylic acid, myristic acid, pentadecylic, palmitic acid, margaric acid, stearic acid, myristoleic acid, palmitoleic acid, vaccenic acid, oleic acid and elaidic acid. Examples of fatty alcohols include cetyl alcohol and stearyl alcohol.

Alkylamine fatty acids are compounds having either of the structures:

$$NR_3HOOC\text{—}R^1 \text{ or } NR_3H^+OOC\text{—}R^1$$

wherein each R is hydrogen or alkyl, provided at least one R is alkyl, and $R^1$ is a linear hydrocarbon group having at least 11 carbon atoms, preferably 11-23 carbon atoms and 0, 1 or 2 non-conjugated carbon-carbon double bonds. Each R is preferably alkyl, and more preferably $C_1$-$C_4$ alkyl. The R groups, when alkyl, may all be the same, or may be different from each other.

Examples of alkylamine fatty acids are alkylamine compounds of any one or more of the foregoing fatty acids. The alkylamine portion of the alkylamine fatty acid may be, for example, methylamine, dimethylamine, trimethylamine, monoethylamine, diethylamine, triethylamine, tri-n-propylamine, triisopropylamine, diisopropylamine, di-n-propylamine, mono-n-butylamine, di-n-butylamine, tri-n-butylamine, mono-, di- or tri-t-butylamine, monocyclohexylamine, dicyclohexylamine and tricyclohexylamine. Preferably the alkylamine portion of the alkylamine is the same alkylamine as component c). An alkylamine fatty acid may be produced in situ when a fatty acid is combined with the alkylamine component c) in preparing the coating composition of the invention.

The fatty acid or fatty alcohol component constitutes 0.25 to 5 wt.-% of the weight of the coating composition. A preferred amount is at least 0.5 wt.-% or at least 0.75 wt.-% and up to 3 wt.-% or up to 2 wt.-%. In the case of an alkylamine fatty acid, only the weight of the fatty acid portion (i.e., HOOC—$R^1$) is counted toward the weight of the fatty acid component; when the alkylamine portion (NR$_3$) corresponds falls within the description of component (c), its weight is counted toward the weight of component c).

Component c) is an alkylamine having a boiling temperature of 75 to 160° C. Examples of suitable such alkylamines include triethylamine, diisopropylamine, triisopropylamine, tri-n-propylamine, mono-n-butylamine, di-n-butylamine and monocyclohexylamine. The coating composition contains 2 to 10 wt.-% the alkylamine, preferably at least 3 wt.-% or at least 4 wt.-% and preferably up to 7 wt.-% thereof, provided the amount of alkylamine is 0.2 to 1.25 parts by weight per part by weight of the drying oil.

Water (component d)) preferably constitutes at least 55 wt.-% or at least 58 wt.-% of the coating composition, and preferably constitutes up to 85 wt.-% or up to 82 wt.-% of the coating composition.

Component e) is a wax or mixture of waxes, the wax or mixture of waxes having a melting temperature of at least 60° C. The melting temperature preferably is up to 120° C., up to 100° C. or up to 90° C. The wax may include, for example, a hydrocarbon wax such as an alkane or mixture of alkanes, an ester compound of the form R$^2$COOCR$^3$, wherein R$^2$ and R$^3$ each are linear hydrocarbon chains having, for example, 12 to 50 carbon atoms, or mixtures of any two or more of the foregoing. The wax may be a natural wax from plant and/or animal sources, and/or a hydrogenated triglyceride from plant and/or animal sources. Examples of suitable plant and/or animal waxes include beeswax, carnauba wax, paraffin wax, rice bran wax, soy wax, emulsifying wax, mixtures of soy wax, palm wax or a mixture of any two or more thereof. The wax may be a mixture of waxes including preferably a mixture of carnauba wax and beeswax. The wax or mixture of waxes constitutes 0.25 to 7.5 wt.-% of the coating composition. In certain embodiments, it constitutes at least 0.5 wt.-% or at least 0.75 wt.-% of the coating composition, and in some embodiments constitutes up to 6 wt.-%, up to 5 wt.-%, up to 4 wt.-% or up to 3 wt.-% of the coating composition. Coating compositions of the invention that are used to apply a DWR coating to a previously dyed fabric preferably contain an amount of wax or mixture of waxes in the higher end of these ranges, such as 3.5 to 7.5 wt.-%, especially 4 to 6 wt.-%.

In certain embodiments, the coating composition further comprises f) 0.25 to 10% by weight of the coating composition of a crosslinking monomer, which is not a fatty acid or alkylamine fatty acid. When cured, coating compositions that contain crosslinking monomers tend to exhibit increased laundry durability, colorfastness and/or crock and wear resistance, compared to an otherwise like case in which the crosslinking monomer is absent. The crosslinking monomer contains at least two carbon-carbon double bonds and has up to 20 carbon atoms, preferably up to 13 carbon atoms. The crosslinking monomer preferably is devoid of fluorine atoms. The crosslinking monomer contains at least two free radical-curable groups per molecule, and may have 2 to 20, 2 to 8 or 2 to 6 such groups. The free radical-curable groups preferably are acrylate or methacrylate groups. Specific examples of crosslinking monomers include 1,4-butanediol diacrylate, 1,6-hexanediol diacrylate, 1,8-octanediol diacrylate, cyclohexane dimethanol diacrylate, trimethylolpropane triacrylate, glycerin triacrylate, pentaerythritol tetraacrylate, dipentaerythritol tetraacrylate, dipentaerythritol hexaacrylate, or a mixture of any two or more thereof. In specific embodiments, the coating composition contains at least 0.75 wt.-% or at least 1 wt.-% of the crosslinking monomer and may contain up to 7.5 wt.-% or up to 5 wt.-% thereof.

The coating composition may contain g) at least one oxidizer selected from the group of peroxy, azo, perborate, persulfate and perchlorate compounds. Examples of such oxidizers include, for example, 1) acyl peroxides, such as acetyl or benzoyl peroxides, 2) alkyl peroxides, such as cumyl, dicumyl, lauroyl, or t-butyl peroxides, 3) hydroperoxides, such as t-butyl or cumyl hydroperoxides, 4) peresters, such t-butyl perbenzoate, 5) other organic peroxides, including acyl alkylsulfonyl peroxides, dialkyl peroxydicarbonates, diperoxyketals, or ketone peroxides, 6) azo compounds, such as 2,2'-azobisisobutyronitrile (AIBN) or 2,2'-azobis(2,4-dimethylpentanenitrile), 4,4'-azobis(4-cyanovaleric acid), or 1,1'-azobis (cyclohexanecarbonitrile), 7) ammonium perborate compounds and alkali metal perborate compounds, 8) various persulfate compounds, such as ammonium persulfate and alkali metal persulfate compounds, 9) ammonium perchlorate and alkali metal perchlorates and (10 hydrogen peroxide (H$_2$O$_2$). Hydrogen peroxide has the particular advantages of being very inexpensive and frequently being readily available at fabric mills for use in bleaching cotton. The amount of oxidizer may be 0.1 to 2 wt.-%, based on the weight of the coating composition in the case of types (1) to (9). Hydrogen peroxide may be present in greater amounts, such as up to 20 wt-%, up to 10% or up to 5%, based on the weight of the coating composition.

The coating composition may comprise h) fumed silica, carbon, graphite or candle black particles, colored or uncolored mica, chitosan, diatomaceous earth or a mixture of any two or more thereof, which when present may constitute 0.1 to 3 wt.-% of the coating composition. The presence of fumed silica, chitosan and/or diatomaceous earth or mixtures thereof, have been found to improve laundry durability of the cured coating and may also provide an effective moth-resistant treatment for wool and other protein-based fabrics. These may also provide resistance against insect or fungus infestation of cotton fabrics.

Coating compositions of particular interest comprise i) an organic dye. Such coating compositions allow for simultaneous dyeing and application of a DWR finish. The organic dye may be water-soluble. The organic may be, for example, a reactive dye containing a chromophore and a reactive substituent that bonds to the fibers of the fabric, a water-soluble anionic dye (acid dye), a water-soluble cationic dye (basic dye), a water-insoluble disperse dye, a sulfur dye or a mixture of any two or more thereof. Examples of suitable dyes include acridine dyes, anthraquinone dyes, arylmethane dyes, azo dyes, phthalocyanine dyes, quinone-imine dyes, thiazole dyes, safranin dyes, and xanthene dyes. In some embodiments, the organic dye comprises indigo, white indigo, indigo carmine, or a mixture of any two or more thereof.

When present, the organic dye may comprise, for example, 0.1 to 5% of the total weight of the coating composition. A preferred upper amount is up to 1.5% or up to 3% of the total weight of the coating composition.

The coating composition may comprise j) a silicone oil. When present, the silicone oil may comprise 0.1 to 2 percent of the total weight of the coating composition. The silicone oil may be or include a linear, branched or cyclic polysiloxane. Examples of polysiloxanes include poly(dimethyl siloxane) (PDMS) and copolymers thereof and siloxane-poly(alkylene glycol) copolymers such as poly(dimethyl siloxane-poly(ethylene glycol) copolymers.

The coating composition may further comprise k) 0.1 to 5 wt.-%, especially 0.1 to 2.5 wt.-9%, based on the weight of the coating composition, of at least one terpene and/or terpenoid compound having 10 to 20 carbon atoms, preferably 15 to 20 carbon atoms. Such terpenes may be provided in the form of a plant essential oil that contains at least 25% or at least 50% by weight of one or more terpenes and/or terpenoid compounds having 10 to 20 carbon atoms. Examples of such plant essential oils include cedarwood oil, eucalyptus oil, pine oil, borage seed oil, rosemary oil, citronella oil, lemon eucalyptus oil, lemongrass oil, thyme oil or a mixture of any two or more thereof. Steam-distilled or chemically extracted plant essentials are especially useful.

The coating composition may further comprise 1) one or more of tannic acid, oxalic acid, alum (potassium alum), ammonium alum, sodium (soda) alum, chrome alum and sodium chloride. Such compounds have found use as mordants in conventional fabric dying operations; when used in the present invention, their presence has been found to improve laundry durability of the applied coating, whether or not a dye is present in the coating composition. The amount of component 1), when present, may be, for example, from 0.01 to 2 wt.-% based on the total weight of the coating composition.

The coating composition in some embodiments has an alkaline pH of 7.5 to 11, especially 8.5 to 11; however, for coating of fabrics containing wool, a lower pH is preferred due to the deleterious effect that pH solutions over 8.0 have on wool. Coating compositions having an alkaline pH are preferred when coating cellulosic fabrics such as cotton, as better laundry durability is often seen when the coating composition is alkaline. pH may be adjusted into the alkaline range by including an aqueous-soluble base in the coating composition. Examples of such bases include alkali metal hydroxides and alkaline earth hydroxides. A preferred base is ammonium hydroxide, which is typically provided in the form of an aqueous solution. The ammonium hydroxide may also improve the solubility of the waxes. Ammonium hydroxide releases ammonia vapors when heated during the curing step, thereby reducing the pH, which is advantageous as multiple post-dyeing rinses and "reductive cleaning" are not needed to remove residual bases from the cured coating. This allows the treated fabric to meet the industry pH specification for apparel having skin contact. In some embodiments, ammonium hydroxide constitutes 0.25 to 25 wt.-% of the coating composition. In specific embodiments, ammonium hydroxide may constitute at least 1 wt.-% or at least 2 wt.-% of the coating composition, and up to 15 wt.-%, up to 12 wt.-%, up to 10 wt.-%, up to 8 wt.-% or up to 6 wt.-% thereof.

Similarly, some dye processes, such as those using acid dyes, work best under acidic conditions. For these cases, a protic acid, in particular a carboxylic acid, may be used to adjust pH into an acidic range such as 3.0 to 5.5. Acetic acid is particularly useful for this purpose because it evaporates at the curing temperature, so there is no hydrophilic residue left on the fabric and therefore no need for post-curing rinses.

The coating composition may further comprise functional materials such as oleophobic and lipophobic treatments, i.e., substances that render the treated substrate not readily absorbent to fats and oils, or repellent to fats and oils; super-hydrophobicity agents; i.e., substances that impart very high (>130°) contact angles of a water droplet with a surface of the treated substrate; antimicrobial treatments, i.e., substances that inhibit microbial growth and/or kill microorganisms, including Cu, Zn, Ag compounds, and chitosan or diatomaceous earth particles; wrinkle-resisting agents, such as melamine-formaldehyde resins and urea-formaldehyde resins; fabric softeners and anti-chafing agents, such as polydimethylsiloxane and polymethylhydrosilane; emollients which create, for example, softness, wear comfort and/or moisturizing properties; solid or liquid flame retardants, including various organophosphorous, phosphorous-containing, bromine-containing and boron-containing compounds including sodium tetraborate and boric acid; and trace forensic chemical markers that are added to the formulation to help detect counterfeit goods or counterfeit finishing treatment.

The coating composition may further comprise one or more other finely divided particulate solids, which do not melt, thermally degrade, dissolve or decompose at a temperature of 150° C. or below or react with other components of the coating composition. The d50 particle size may be, for example, smaller than 100 mm, smaller than 10 mm, smaller than 1 mm, smaller than 500 nm or smaller than 100 nm, as measured by dynamic light scattering methods. The d50 particle size may be at least 5 nm, at least 10 nm or at least 20 nm. Examples of such finely divided particles include fumed silica; cellulosic nano-crystals; perlite and expanded perlite, chitosan and diatomaceous earth; plant products such as corn starch and wheat, corn, rice or wood flour; various metals; various metal oxides such as titanium dioxide, zirconia and alumina; ceramic or inorganic particles such as talc, steatite, iron carbonate, calcium carbonate, aluminum hydroxide, magnesium hydroxide, various borates, boron and/or phosphorous compounds, titanium carbide, tungsten carbide, pumice and silicon carbide; thermoset polymers; thermoplastic polymers (such as polylactic acid, polyethylene, polypropylene, polystyrene, polytetrafluoroethylene, poly(vinyl fluoride), poly(vinylidene fluoride), poly(hexafluoropropylene), poly(perfluoropropylvinylether), poly-(perfluoromethylvinylether), poly (chlorotrifluoroethylene); glass microspheres and the like. The finely divided particulate solid may constitute 0.1 to 3 wt.-% of the weight of the coating composition.

The coating composition can be prepared by forming separate organic and aqueous phases, which are then combined with vigorous agitation to disperse the organic phase into the aqueous phase (or vice versa) to produce an emulsion. The emulsion includes a liquid (at 23° C.) aqueous phase and a liquid (at 23° C.) organic phase, either of which may be the continuous phase. Most typically, the emulsion has a continuous aqueous phase and a disperse liquid organic phase, but in some embodiments, the aqueous phase may form the disperse phase. Solid components, if any, may be dispersed in either or both of the aqueous and organic phases.

In a particular process, the drying oil and alkylamine are first combined and allowed to dissolve into each other. The fatty acid component, crosslinking monomer(s) (if used), oil-soluble oxidizer and terpenes, terpenoid and/or terpene- or terpenoid-containing plant essential oil (if used) are then added and blended in. The wax(es) are then added and the mixture heated to a temperature sufficient to melt them. This produces an organic phase. Alternatively, the waxes may be combined in their solid form and then melted together and the liquid wax is then added to the other oil-based components. This method is advantageous to avoid evaporative loss of the alkylamine emulsifier.

Separately, water is combined with water-soluble or dispersible ingredients such as the organic dye (if used) and water-soluble oxidizer to produce an aqueous phase. The organic and aqueous phases are then combined with vigorous agitation to disperse the organic phase into the aqueous phase (or vice versa) and produce an at least temporarily stable (as defined below), emulsion. This can be done at any convenient temperature such as from 10 to 80° C. It is generally convenient to add the particulate solid (if used) to either or both of the aqueous or organic phases before forming the emulsion.

The resulting emulsion is somewhat resistant to phase separation. Preferably, it does not phase separate for at least 15 minutes, preferably at least 30 minutes, at least one hour or at least several hours, and especially for at least 1 or 2 days at 23° C. after being produced, in the absence of agitation. This allows the coating composition to be produced and stored for various periods before being applied. It is often convenient to produce the emulsion continuously as part of a coating process, whereby separate organic and aqueous phases are combined and emulsified, then immediately applied to a substrate to produce a coating. In some cases, it may be optionally desirable to add an emulsion stabilizer, such as xanthan gum, polysorbate 20, 60 or 80, lecithin, corn starch, psyllium husk or guar gum to stabilize the lifetime of the emulsion by inhibiting phase separation.

The coating composition can be applied to a fabric or other substrate by spraying, rolling, brushing, pouring, immersion or other method as may be suitable for coating the particular substrate. The coating composition may be applied at a temperature of, for example, 10 to 70° C., especially 15 to 50° C. Excess coating composition can be removed by "padding", wringing, rolling through nip rollers or similar method, if necessary. A suitable application weight is at least 3, at least 20 or at least 40 grams per square meter (gsm) and to 500, up to 300 or up to 200 gsm. Preferably, the cured coating may weigh, for example, 4 to 70 gsm.

The coating composition is cured in air, preferably at a temperature of 100 to 160° C., to produce the coating. Curing may be achieved by first heating the coated substrate to a temperature of 100 to 125° C. to remove water, followed by heating to a single higher temperature or progressively higher temperatures in the range of 126 to 160° C., especially 126 to 150° C.

The coating composition is conveniently applied and cured in a continuous process in which the substrate is moved through successive stations in which the coating composition is applied, optionally "padded" or wrung to remove excess liquid, then cured at elevated temperature. A fabric substrate may be pulled through a tenter frame, for example, for transportation through the various operations. Alternatively, or in addition, one or more drive rollers may move the fabric through the various operations.

The coating composition may also be cured by pulling the coated fabric over multiple heated metal drums, with the coating exposed to ambient air during this process.

The substrate can be any fibrous material that is capable of being carried through the coating process and the polymerization process. By "fibrous", it is meant that a surface of the substrate to which the chemical treatment mixture is applied is made up of or includes fibers of at least one type, and that the substrate includes spaces between the fibers into which the applied chemical treatment mixture can penetrate. The fibers may be, for example, woven, knitted, entangled, knotted, felted, glued or otherwise formed into a fabric (i.e., a flat material that may be subsequently sewn or otherwise fabricated into a garment or other article) having sufficient mechanical integrity to be carried through the process of the invention. Such a fabric includes fibers that may be, for example, a natural fiber such as cotton, hemp, wool, linen, silk, precipitated cellulose (Lyocell, Tencel®, for example), rayon, bamboo, cellulose and the like; or a synthetic fiber such as nylon, aramid, acrylic, polyolefin (such as ultrahigh molecular weight polyethylene), polypropylene, polyester, polyacetate, polylactic acid, cellulose ester, polyether polyurea or other synthetic fiber; and blends of any two or more of the above. It may a smooth, textured or fleeced fabric.

The substrate may be at the time the coating is applied an article such as an article of clothing, individual footwear, awning, tarpaulin, umbrella, tarp, curtain or other window treatment, upholstery, carpet, a blanket, bedding and the like.

In other embodiments, including, but not limited to footwear, the substrate may be coated on one side as is the case, for example, with leather, or synthetic leather products, such as vinyl, or for athletic shoes, polyester, polypropylene or nylon, including mixtures of synthetic and natural fibers, which have an exposed fibrous surface on the side that is coated.

The substrate also may be a nonwoven, or a cellulosic material such as paper or cardboard and the like.

Coated substrates made in accordance with this invention are useful in applications in which hydrophobicity is desired, such as water or stain-repellent treatments, moisture barriers, battery and fuel cell separators, bandages, antimicrobial fabrics, carpet stain and fade protection, wall and window furnishings, body armor and other para-aramids for ballistic or fire protection, rain gear and outdoor furniture coverings and upholstery, leather or canvas shoe and boot treatments, athletic shoes, headwear, capes, uniforms and other apparel, leather upholstery and apparel and other automotive and furniture upholstery, tents, sails, awnings and tarpaulins, umbrellas, hospital scrubs and gowns, medical covers, blankets and bedding, mattress ticking, automotive nonwovens, outdoor performance and sports apparel, including but not limited to outerwear and sweatshirts.

The following examples are intended to illustrate the invention but not to limit the scope thereof. All parts and percentages are by weight unless otherwise indicated.

EXAMPLE 1

A premix is made by mixing the following ingredients except the wax, heating to 82° C. until a homogeneous mixture is obtained, and then melting the wax into the mixture.

| Premix 1 | |
|---|---|
| Component | Parts by Weight |
| Tung Oil | 12.05 |
| Triethylamine | 4 |
| Lauric Acid | 1 |
| Trimethylolpropane triacetate | 2 |
| Cedarwood Oil | 1.51 |
| Carnauba Wax | 0.435 |
| Beeswax | 0.871 |

Separately, an aqueous phase is prepared by combining 41 parts water, 5 parts of an aqueous 28% ammonium hydroxide solution, 0.32 parts of benzoyl peroxide and 0.26 parts of indigo carmine dye. The aqueous phase is then added to the oil phase and emulsified in a high-speed laboratory mixture to produce an oil-in-water emulsion. 0.53 parts by weight of a hydrophilic fumed silica is then mixed into the emulsion to produce Coating Composition Example 1. Its pH is 8.5 to 11. The overall composition of Example 1 is as follows:

Example 1 Composition

| Component | Parts by Weight | % By Weight[1] |
|---|---|---|
| Tung Oil | 12.05 | 17.5% |
| Triethylamine | 4 | 5.8% |
| Lauric Acid | 1 | 1.45% |
| Trimethylolpropane Triacrylate | 2 | 2.9% |
| Cedarwood Oil | 1.51 | 2.2% |
| Carnauba Wax | 0.435 | 0.6% |
| Beeswax | 0.87 | 1.3% |
| $NH_4OH$ | 1.4 | 2.0% |
| Water | 44.6 | 66.7% |
| Indigo Carmine Dye | 0.26 | 0.4% |
| Benzoyl Peroxide | 0.32 | 0.5% |
| Hydrophilic Fumed Silica | 0.53 | 0.8% |

[1]Total may not add to 100% due to rounding.

A 100% cotton, poplin weave fabric weighing 144 gsm is immersed into the coating composition for a few minutes at room temperature, followed by padding the wetted fabric and wringing out excess fluid. The wetted and wrung fabric is coated with approximately 134 gsm of the coating composition. The wetted fabric is then cured in air at 149° C. for fifteen minutes to produce a dyed fabric. The approximate weight of the cured coating is 55 gsm. After curing, fabric exhibits a rich blue color characteristic of the indigo dye.

Water repellency of the coated fabric is evaluated according to the AATCC 22 Water Repellency Spray Test, prior to laundering and then after the fabric has undergone multiple home laundry wash/dry cycles. Results are as indicated in Table 1.

TABLE 1

AATCC 22 Spray Test Results, Example 1

| Number Wash/Dry Cycles | Water Weight Gained, g | Rating |
|---|---|---|
| 0 | 0.023 | 100 |
| 5 | 0.050 | 100 |
| 10 | 0.051 | 100 |
| 15 | 0.112 | 95-100 |
| 20 | 0.092 | 95-100 |
| 25 | 0.132 | 95 |
| 30 | 0.138 | 95 |

The coating composition of the invention allows for dying and application of a hydrophobic coating in one treatment step. The coated fabric exhibits excellent hydrophobicity, which persists even after many wash/dry cycles. No rinsing or neutralization is required after the heat-based curing process.

EXAMPLE 2

Coating Composition Example 2 is prepared in the same general manner as described in Example 1. The overall composition is as follows:

Example 2 Composition

| Component | Parts by Weight | % By Weight[1] |
|---|---|---|
| Tung Oil | 12.15 | 16.6% |
| Triethylamine | 4 | 5.45% |
| Lauric Acid | 1 | 1.4% |
| Trimethylolpropane Triacrylate | 2.15 | 2.9% |
| Cedarwood Oil | 1.57 | 2.1% |
| Carnauba Wax | 0.434 | 0.6% |
| Beeswax | 0.53 | 1.2% |

Example 2 Composition

| Component | Parts by Weight | % By Weight[1] |
|---|---|---|
| Water | 50 | 68.2% |
| CHT Blue Reactive Dye | 0.31 | 0.4% |
| Benzoyl Peroxide | 0.32 | 0.4% |
| Hydrophilic Fumed Silica | 0.53 | 0.7% |

[1]Total may not add to 100% due to rounding.

A knit 100% polyamide fabric weighing 194 gsm (grams per square meter) is immersed into the coating composition at room temperature, followed by padding the wetted fabric and wringing out excess fluid. The wetted and wrung fabric is coated with approximately 159 gsm of the coating composition. The wetted fabric is then cured in air at 141° C. for fifteen minutes to produce a dyed fabric. The approximate weight of the cured coating is 47 gsm. After curing, the fabric exhibits a rich blue color characteristic of the dye.

The coated fabric is evaluated using the AATCC Spray Test as before, with results as indicated in Table 2.

TABLE 2

AATCC 22 Spray Test Results, Example 2

| Number Wash/Dry Cycles | Water Weight Gained, g | Rating |
|---|---|---|
| 0 | 0.150 | 95 |
| 5 | 0.103 | 100 |
| 10 | 0.086 | 100 |
| 15 | 0.073 | 100 |
| 20 | 0.077 | 100 |
| 25 | 0.129 | 100 |
| 30 | 0.161 | 90 |

Excellent coloration and hydrophobicity are obtained with the invention on a polyamide fabric. No rinsing or neutralization is required after the heat-based curing process.

EXAMPLE 3

Coating Composition Example 3 is prepared in the same general manner as described in Example 1. The overall composition is as follows:

Example 3 Composition

| Component | Parts by Weight | % By Weight[1] |
|---|---|---|
| Tung Oil | 5.87 | 8.5% |
| Triethylamine | 4 | 5.8% |
| Lauric Acid | 0.75 | 1.1% |
| Trimethylolpropane Triacrylate | 2 | 2.9% |
| Cedarwood Oil | 1.2 | 1.7% |
| Carnauba Wax | 0.38 | 0.55% |
| Beeswax | 0.77 | 1.1% |
| Water | 56 | 81.2% |
| CHT Red Reactive Dye | 0.1 | 0.15% |
| Benzoyl Peroxide | 0.23 | 0.3% |
| Hydrophilic Fumed Silica | 0.53 | 0.8% |

[1]Total may not add to 100% due to rounding.

A knit 100% polyester fabric weighing 173 gsm is immersed into the coating composition at room temperature, followed by padding the wetted fabric and wringing out excess fluid. The wetted and wrung fabric is coated with approximately 157 gsm of the coating composition. The wetted fabric is then dried in air at 107° C. for 5 minutes, followed by curing at 138° C. to produce a dyed fabric. The approximate weight of the cured coating is 35 gsm. After curing, the fabric exhibits a rich red color characteristic of the dye.

The coated fabric is evaluated using the AATCC Spray Test as before, with results as indicated in Table 3.

TABLE 3

| AATCC 22 Spray Test Results, Example 3 | | |
| --- | --- | --- |
| Number Wash/Dry Cycles | Water Weight Gained, g | Rating |
| 0 | 0.175 | 95 |
| 5 | 0.072 | 100 |
| 10 | 0.073 | 100 |
| 15 | 0.074 | 100 |
| 20 | 0.073 | 100 |
| 25 | 0.062 | 100 |
| 30 | 0.054 | 100 |

Excellent coloration and hydrophobicity are obtained with the invention on a polyester fabric. No rinsing or neutralization is required after the heat-based curing process.

EXAMPLE 4

Coating Composition Example 4 is prepared in the same general manner as described in Example 1. The overall composition is as follows:

| Example 4 Composition | | |
| --- | --- | --- |
| Component | Parts by Weight | % By Weight[1] |
| Tung Oil | 5.1 | 8.8% |
| Triethylamine | 3 | 5.2% |
| Lauric Acid | 0.5 | 0.9% |
| Trimethylolpropane Triacrylate | 1.04 | 1.8% |
| Cedarwood Oil | 1.2 | 1.7% |
| Carnauba Wax | 0.4 | 0.7% |
| Beeswax | 0.85 | 1.5% |
| Water | 45 | 80% |
| CHT Red Reactive Dye | 0.1 | 0.2% |
| Benzoyl Peroxide | 0.21 | 0.4% |
| Hydrophilic Fumed Silica | 0.53 | 0.9% |

[1]Total may not add to 100% due to rounding.

Knit 100% polyester (171 gsm) and knit 100% polyamide (186 gsm) fabrics each are coated with Coating Composition Example 4, in the same general manner as described in Example 3. In each case, the fabric is immersed into the coating composition at room temperature, followed by padding the wetted fabric and wringing out excess fluid. The wetted and wrung fabrics are coated with approximately 162 gsm and 147 gsm of the coating composition, respectively. The wetted fabric is then dried in air at 107° C. for 5 minutes, followed by curing at 138° C. to produce a dyed fabric. The approximate weights of the cured coatings are 36 gsm and 23 gsm, respectively, for the polyester and the polyamide fabrics. In each case, after curing the fabric exhibits a rich red color characteristic of the dye.

The coated fabric is evaluated using the AATCC Spray Test as before, with results as indicated in Table 4.

14

TABLE 4

| AATCC 22 Spray Test Results, Example 4 | | | |
| --- | --- | --- | --- |
| Fabric | Number Wash/Dry Cycles | Water Weight Gained, g | Rating |
| Polyester | 0 | 0.225 | 90 |
| Polyester | 5 | 0.077 | 100 |
| Polyester | 10 | 0.140 | 95 |
| Polyester | 15 | 0.060 | 100 |
| Polyester | 20 | 0.072 | 100 |
| Polyester | 25 | 0.067 | 100 |
| Polyester | 30 | 0.056 | 100 |
| Polyamide | 0 | 0.122 | 95 |
| Polyamide | 5 | 0.060 | 100 |
| Polyamide | 10 | 0.075 | 100 |
| Polyamide | 15 | 0.070 | 100 |
| Polyamide | 20 | 0.060 | 100 |
| Polyamide | 25 | 0.047 | 100 |
| Polyamide | 30 | 0.042 | 100 |

Excellent coloration and hydrophobicity are obtained with the invention on both polyester and polyamide fabrics. No rinsing or neutralization is required after the heat-based curing process.

EXAMPLE 5

Coating Composition Example 5 is prepared in the same general manner as described in Example 1. The overall composition is as follows:

| Example 5 Composition | | |
| --- | --- | --- |
| Component | Parts by Weight | % By Weight[1] |
| Tung Oil | 6.22 | 7.1% |
| Triethylamine | 4 | 5.0% |
| Lauric Acid | 1 | 1.2% |
| Trimethylolpropane Triacrylate | 4 | 5.0% |
| Cedarwood Oil | 1.3 | 1.6% |
| Carnauba Wax | 0.38 | 0.5% |
| Beeswax | 0.81 | 1.0% |
| Water | 62 | 76.9% |
| CHT Red Reactive Dye | 0.1 | 0.1% |
| Benzoyl Peroxide | 0.3 | 0.4% |
| Hydrophilic Fumed Silica | 0.55 | 0.7% |

[1]Total may not add to 100% due to rounding.

A knit 100% polyester fabric weighing 172 gsm, a knit 90% polyamide/10% Elastane fabric weighing 183 gsm and a poplin weave 100% cotton fabric weighing 147 gsm each are coated with Coating Composition Example 5, in the same general manner as described in Example 3. The fabrics are immersed separately into the coating composition at room temperature, followed by padding the wetted fabric and wringing out excess fluid. The wetted and wrung fabrics are coated with approximately 152 gsm, 119 gsm and 121 gsm of the coating composition, respectively. The wetted polyester and polyamine/Elastane fabrics are then dried in air at 107° C. for 5 minutes, followed by curing at 138° C. to produce a dyed fabric. The cotton fabric is cured at 149° C. for five minutes. The approximate weights of the cured coating in each case are 39, 23, and 21 gsm, respectively, for the polyester, polyamide blend and cotton fabric samples. In each case, after curing the fabric exhibits a rich red color characteristic of the dye.

The coated fabric is evaluated using the AATCC Spray Test as before, with results as indicated in Table 5.

TABLE 5

| | Number Wash/Dry | Water Weight | |
|---|---|---|---|
| Fabric | Cycles | Gained, g | Rating |
| Polyester | 0 | 0.273 | 80-90 |
| Polyester | 5 | 0.081 | 100 |
| Polyester | 10 | 0.176 | 90 |
| Polyester | 15 | 0.059 | 100 |
| Polyester | 20 | 0.073 | 100 |
| Polyester | 25 | 0.084 | 100 |
| Polyester | 30 | 0.060 | 100 |
| Polyamide/Elastane | 0 | 0.223 | 90 |
| Polyamide/Elastane | 5 | 0.069 | 100 |
| Polyamide/Elastane | 10 | 0.080 | 100 |
| Polyamide/Elastane | 15 | 0.076 | 100 |
| Polyamide/Elastane | 20 | 0.073 | 100 |
| Polyamide/Elastane | 25 | 0.077 | 100 |
| Polyamide/Elastane | 30 | 0.129 | 95 |
| Cotton | 0 | 0.085 | 100 |
| Cotton | 5 | 0.106 | 100 |
| Cotton | 10 | 0.117 | 100 |
| Cotton | 15 | 0.215 | 80-90 |
| Cotton | 20 | 0.422 | 70 |

AATCC 22 Spray Test Results, Example 5

Excellent coloration and hydrophobicity are obtained with the invention on each of the polyester, polyamide/Elastane and cotton fabrics. These excellent properties persist through at least 30 wash/dry cycles for the polyester and polyamide/Elastane fabrics.

Some loss of hydrophobic properties is seen with the cotton fabric after about 15 wash/dry cycles. This result is contrary to the results in Example 1, in which excellent hydrophobicity is retained even after 30 wash cycles. The main difference between Examples 1 and 5 is the presence of a base (ammonium hydroxide) in the Example 1 coating composition, which results in a higher pH. The higher pH coating composition is preferred for treating cotton and other cellulosic fabrics. No rinsing or neutralization is required after the heat-based curing process.

EXAMPLE 6

Coating Composition Example 6 is prepared in the same general manner as described in Example 1. The overall composition is as follows; its pH is 8.5 to 11:

Example 6 Composition

| Component | Parts by Weight | % By Weight[1] |
|---|---|---|
| Tung Oil | 5 | 6.5% |
| Triethylamine | 4.1 | 5.3% |
| Lauric Acid | 1 | 1.3% |
| Trimethylolpropane Triacrylate | 2.1 | 2.7% |
| Carnauba Wax | 0.17 | 0.2% |
| Beeswax | 0.73 | 0.95% |
| $NH_4OH$ | 17.6 | 22.9% |
| Water | 45.4 | 58.9% |
| CHT Yellow Reactive Dye | 0.13 | 0.2% |
| Lauroyl Peroxide | 0.35 | 0.5% |
| Hydrophilic Fumed Silica | 0.53 | 0.7% |

[1]Total may not add to 100% due to rounding.

Coating Composition Example 6 is sprayed onto both sides of a knit 100% polyamide fabric weighing 209 gsm. Approximately 184 gsm of the coating composition are applied. The wetted fabric is then cured in air at 141° C. for fifteen minutes to produce a dyed fabric. The approximate weight of the cured coating is 36 gsm. After curing, the fabric exhibits a rich yellow color characteristic of the dye.

The coated fabric is evaluated using the AATCC Spray Test as before, with results as indicated in Table 6.

TABLE 6

AATCC 22 Spray Test Results, Example 6

| Number Wash/Dry Cycles | Water Weight Gained, g | Rating |
|---|---|---|
| 0 | 0.113 | 95-100 |
| 5 | 0.049 | 100 |
| 10 | 0.041 | 100 |
| 15 | 0.044 | 100 |
| 20 | 0.040 | 100 |
| 25 | 0.039 | 100 |
| 30 | 0.034 | 100 |

Once again excellent coloration and durable hydrophobicity are obtained with the invention on a polyamide fabric. No rinsing or neutralization is required after the heat-based curing process.

EXAMPLE 7

Coating Composition Example 7 is prepared in the same general manner as described in Example 1. The overall composition is as follows:

Example 7 Composition

| Component | Parts by Weight | % By Weight[1] |
|---|---|---|
| Tung Oil | 3.92 | 6.35% |
| Triethylamine | 3 | 4.9% |
| Lauric Acid | 0.76 | 1.2% |
| Trimethylolpropane Triacrylate | 1.6 | 2.6% |
| Carnauba Wax | 0.434 | 0.6% |
| Beeswax | 0.53 | 1.2% |
| 28% $NH_4OH$ | 14.3 | 23.15% |
| Water | 36.7 | 59.5 |
| CHT Yellow Reactive Dye | 0.18 | 0.3% |
| Lauroyl Peroxide | 0.26 | 0.4% |
| Hydrophilic Fumed Silica | 0.3 | 0.5% |

[1]Total may not add to 100% due to rounding.

Coating Composition Example 7 A is sprayed onto each side of a 100% cotton poplin weave fabric weighing 149 gsm. The approximate coating weight before curing is 89 gsm. The wetted fabric is then cured in air at 149° C. for fifteen minutes to produce a dyed fabric. The approximate weight of the cured coating is 49 gsm. After curing, the fabric exhibits a rich yellow color characteristic of the dye.

The coated fabric is evaluated using the AATCC Spray Test as before, with results as indicated in Table 7.

TABLE 7

AATCC 22 Spray Test Results, Example 7

| Number Wash/Dry Cycles | Water Weight Gained, g | Rating |
|---|---|---|
| 0 | 0.031 | 100 |
| 5 | 0.045 | 100 |
| 10 | 0.053 | 100 |
| 15 | 0.069 | 100 |
| 20 | 0.094 | 100 |
| 25 | 0.090 | 100 |
| 30 | 0.113 | 95-100 |

Once again, excellent coloration and durable hydrophobicity are obtained with the invention on a cotton fabric. No rinsing or neutralization is required after the heat-based curing process.

EXAMPLE 8

Coating Composition Example 8 is prepared in the same general manner as described in Example 1. The overall composition is as follows:

| Example 8 Composition | | |
|---|---|---|
| Component | Parts by Weight | % By Weight[1] |
| Tung Oil | 6 | 7.4% |
| Triethylamine | 4 | 4.9% |
| Lauric Acid | 1 | 1.2% |
| Trimethylolpropane Triacrylate | 2 | 2.5% |
| Carnauba Wax | 0.206 | 0.25% |
| Beeswax | 0.817 | 1% |
| Water | 65 | 79.9% |
| MX Blue Reactive Dye | 0.18 | 0.22% |
| Benzoyl Peroxide | 0.307 | 0.4% |
| Hydrophilic Fumed Silica | 0.524 | 0.6% |
| Polydimethylsiloxane | 1.31 | 1.6% |

[1]Total may not add to 100% due to rounding.

A knit 100% polyester fabric weighing 136 gsm is immersed into the coating composition at room temperature, followed by padding the wetted fabric and wringing out excess fluid. The wet and wrung fabric is coated with approximately 123 gsm of the coating composition. The wetted fabric is then cured in air at 141° C. for fifteen minutes to produce a dyed fabric. The approximate weight of the cured coating is 17.5 gsm. After curing, the fabric exhibits a rich blue color characteristic of the dye.

The coated fabric is evaluated using the AATCC Spray Test as before, with results as indicated in Table 8.

TABLE 8

| AATCC 22 Spray Test Results, Example 8 | | |
|---|---|---|
| Number Wash/Dry Cycles | Water Weight Gained, g | Rating |
| 0 | 0.026 | 100 |
| 5 | 0.049 | 100 |
| 10 | Not measured | 100 |
| 15 | 0.110 | 100 |
| 20 | 0.050 | 100 |
| 25 | 0.094 | 100 |
| 30 | 0.138 | 95 |

Excellent coloration and durable hydrophobicity are obtained.

EXAMPLE 9

Coating Composition Example 9 is prepared in the same general manner as described in Example 1. The overall composition is as follows; its pH is 8 to 11:

| Example 9 Composition | | |
|---|---|---|
| Component | Parts by Weight | % By Weight[1] |
| Tung Oil | 15.04 | 14.5% |
| Triethylamine | 4 | 3.9% |
| Lauric Acid | 1 | 1.0% |
| Trimethylolpropane Triacrylate | 2 | 1.9% |
| Carnauba Wax | 0.175 | 0.2% |
| Beeswax | 0.805 | 0.8% |
| 28% NH₄OH | 11.2 | 10.8% |

-continued

| Example 9 Composition | | |
|---|---|---|
| Component | Parts by Weight | % By Weight[1] |
| Water | 68.8 | 66.5% |
| Lauroyl Peroxide | 0.202 | 0.2% |
| Hydrophilic Fumed Silica | 0.304 | 0.3% |

[1]Total may not add to 100% due to rounding.

Coating Composition Example 9 is sprayed onto both sides of a knit 53% polyamide/28% cotton/19% Elastane fabric weighing 297 gsm. The wetted fabric is then cured in air at 141° C. for fifteen minutes to produce a dyed fabric. The approximate weight of the cured coating is 84 gsm.

The coated fabric is evaluated using the AATCC Spray Test as before, with results as indicated in Table 9.

TABLE 9

| AATCC 22 Spray Test Results, Example 9 | | |
|---|---|---|
| Number Wash/Dry Cycles | Water Weight Gained, g | Rating |
| 0 | 0.237 | 80-90 |
| 5 | 0.154 | 95 |
| 10 | 0.097 | 100 |
| 15 | 0.063 | 100 |
| 20 | 0.068 | 100 |
| 25 | 0.114 | 95-100 |
| 30 | 0.057 | 100 |

Excellent durable hydrophobicity is again seen.

EXAMPLE 10

Coating Composition Example 10 is prepared in the same general manner as described in Example 1. The overall composition is as follows:

| Example 10 Composition | | |
|---|---|---|
| Component | Parts by Weight | % By Weight[1] |
| Tung Oil | 14.2 | 12.7% |
| Triethylamine | 6 | 5.4% |
| Oleic Acid | 1.54 | 1.4% |
| Trimethylolpropane Triacrylate | 4.49 | 4.0% |
| Carnauba Wax | 1.21 | 1.1% |
| Beeswax | 1.928 | 1.7% |
| Water | 80 | 71.8% |
| Prochem D363 Reactive Red Dye | 0.434 | 0.4% |
| Benzoyl Peroxide | 0.5 | 0.45% |
| Hydrophilic Fumed Silica | 1.1 | 1.0% |

[1]Total may not add to 100% due to rounding.

Knit 100% polyester (170 gsm) and knit 100% polyamide (185 gsm) fabrics are coated with Coating Composition Example 10, in the same general manner as described in Example 3. In each case, the fabric is immersed into the coating composition at room temperature, followed by padding the wetted fabric and wringing out excess fluid. The wetted fabric is then cured in air at 138° C. for 15 minutes to produce a dyed fabric. The approximate weight of the cured coating is approximately 32 gsm for the polyester fabric and 25 gsm for the polyamide fabric. In each case, after curing the fabric exhibits a rich red color characteristic of the dye.

The coated fabric is evaluated using the AATCC Spray Test as before, with results as indicated in Table 10.

TABLE 10

| | AATCC 22 Spray Test Results, Example 10 | | |
|---|---|---|---|
| Fabric | Number Wash/ Dry Cycles | Water Weight Gained, g | Rating |
| Polyester | 0 | 0.211 | 90 |
| Polyester | 5 | 0.091 | 100 |
| Polyester | 10 | 0.078 | 100 |
| Polyester | 15 | 0.069 | 100 |
| Polyester | 20 | 0.055 | 100 |
| Polyester | 25 | 0.036 | 100 |
| Polyester | 30 | 0.052 | 100 |
| Polyamide | 0 | 0.055 | 100 |
| Polyamide | 5 | 0.043 | 100 |
| Polyamide | 10 | 0.032 | 100 |
| Polyamide | 15 | 0.034 | 100 |
| Polyamide | 20 | 0.039 | 100 |
| Polyamide | 25 | 0.027 | 100 |
| Polyamide | 30 | 0.034 | 100 |

Excellent coloration and hydrophobicity are obtained with the invention on both polyester and polyamide fabrics.

EXAMPLE 11

Coating Composition Example 11 is prepared in the same general manner as described in Example 1. The overall composition is as follows:

| Example 11 Composition | | |
|---|---|---|
| Component | Parts by Weight | % By Weight[1] |
| Tung Oil | 14 | 12.6% |
| Triethylamine | 6.04 | 5.4% |
| Oleic Acid | 1.52 | 1.4% |
| Trimethylolpropane Triacrylate | 4 | 3.6% |
| Borage Seed Oil | 1 | 0.9% |
| Carnauba Wax | 1.054 | 0.95% |
| Beeswax | 1.809 | 1.6% |
| Water | 80 | 71.9% |
| Prochem D363 Reactive Red Dye | 0.303 | 0.3% |
| Benzoyl Peroxide | 0.475 | 0.4% |
| Hydrophilic Fumed Silica | 1.066 | 1.0% |

[1]Total may not add to 100% due to rounding.

A knit 90% polyamide/10% Elastane fabric weighing 209 gsm is coated with Coating Composition Example 11, in the same general manner as described in Example 3. The fabric is immersed into the coating composition at room temperature, followed by padding the wetted fabric and wringing out excess fluid. The wetted fabric is then cured in air at 138° C. for fifteen minutes to produce a dyed fabric. The approximate weight of the cured coating is approximately 37 gsm. The cured fabric exhibits a rich red color characteristic of the dye.

The coated fabric is evaluated using the AATCC Spray Test as before, with results as indicated in Table 11.

TABLE 11

| AATCC 22 Spray Test Results, Example 11 | | |
|---|---|---|
| Number Wash/ Dry Cycles | Water Weight Gained, g | Rating |
| 0 | 0.187 | 90 |
| 5 | 0.110 | 95 |
| 10 | 0.100 | 100 |
| 15 | 0.106 | 95-100 |
| 20 | 0.117 | 95-100 |

TABLE 11-continued

| AATCC 22 Spray Test Results, Example 11 | | |
|---|---|---|
| Number Wash/ Dry Cycles | Water Weight Gained, g | Rating |
| 25 | 0.152 | 95 |
| 30 | 0.128 | 95 |

Excellent coloration and hydrophobicity are obtained with the invention on both polyester and polyamide fabrics. No rinsing or neutralization is required after the heat-based curing process.

EXAMPLE 12

Coating Composition Example 12 is prepared in the same general manner as described in Example 1. The overall composition is as follows; the pH is 8.5 to 11:

| Example 12 Composition | | |
|---|---|---|
| Component | Parts by Weight | % By Weight[1] |
| Tung Oil | 15.0 | 14.4% |
| Triethylamine | 4.0 | 3.8% |
| Lauric Acid | 1.0 | 1.0% |
| Trimethylolpropane Triacrylate | 2 | 1.9% |
| Carnauba Wax | 0.175 | 0.16% |
| Beeswax | 0.805 | 0.77% |
| NH₄OH* | 11.2 | 10.75 |
| Water | 69.2 | 66.4% |
| Lauroyl Peroxide | 0.202 | 0.19% |
| Hydrophilic Fumed Silica | 0.566 | 0.5% |

[1]Total may not add to 100% due to rounding.

*NH₄OH provided as a 28% solution in water. The indicated quantity of water includes the water from the NH₄OH solution plus additional added water.

Coating Composition Example 12 is sprayed onto both sides of a knit 53% polyamide/28% cotton/19% Elastane fabric weighing 297 gsm. The wetted fabric is then cured in air at 141° C. for fifteen minutes to produce a coated fabric. The approximate weight of the cured coating is 84 gsm.

The coated fabric is evaluated using the AATCC Spray Test as before, with results as indicated in Table 12.

TABLE 12

| AATCC 22 Spray Test Results, Example 12 | | |
|---|---|---|
| Number Wash/ Dry Cycles | Water Weight Gained, g | Rating |
| 0 | 0.237 | 80-90 |
| 5 | 0.154 | 95 |
| 10 | 0.097 | 100 |
| 15 | 0.063 | 100 |
| 20 | 0.068 | 100 |
| 25 | 0.114 | 95-100 |
| 30 | 0.057 | 100 |

Excellent hydrophobicity is obtained with the invention.

EXAMPLE 13

Coating Composition Example 13 is prepared in the same general manner as described in Example 1. The overall composition is as follows:

| Example 13 Composition | | |
|---|---|---|
| Component | Parts by Weight | % By Weight[1] |
| Tung Oil | 12.1 | 19.5% |
| Triethylamine | 4 | 6.4% |
| Oleic Acid | 0.92 | 1.5% |
| Trimethylolpropane Triacrylate | 2.0 | 3.2% |
| Carnauba Wax | 0.63 | 1.0% |
| Beeswax | 0.99 | 1.6% |
| Cedarwood Oil | 1.5 | 2.4% |
| Hydrogen Peroxide[2] | 4.8 | 7.7% |
| Water | 34.2 | 55.1% |
| CHT Reactive Red Dye V-RB133 | 0.328 | 0.5% |
| Hydrophilic Fumed Silica | 0.561 | 0.9% |

[1]Total may not add to 100% due to rounding.
[2]Water and hydrogen peroxide provided as a 12% hydrogen peroxide solution in water.

A woven ventile cotton fabric weighing 188 gsm is coated with Coating Composition Example 13, in the same general manner as described in Example 1. The wetted fabric is then cured in air at 149° C. for 15 minutes to produce a dyed fabric. The approximate weight of the cured coating is approximately 36 gsm. The cured fabric exhibits a rich red color characteristic of the dye.

The coated fabric is evaluated using the AATCC Spray Test as before, with results as indicated in Table 13.

TABLE 13

| AATCC 22 Spray Test Results, Example 13 | | |
|---|---|---|
| Number Wash/ Dry Cycles | Water Weight Gained, g | Rating |
| 0 | 0.024 | 100 |
| 5 | 0.099 | 100 |
| 10 | 0.048 | 100 |
| 15 | 0.073 | 100 |
| 20 | 0.079 | 100 |
| 25 | 0.124 | 95 |

Excellent coloration and hydrophobicity are obtained with the invention on both polyester and polyamide fabrics and for the same fibers blended with elastane for stretch. No rinsing or neutralization is required after the heat-based curing process.

EXAMPLE 14

Coating Composition Example 14 is prepared in the same general manner as described in Example 1. The overall composition is as follows:

| Example 14 Composition | | |
|---|---|---|
| Component | Parts by Weight | % By Weight[1] |
| Tung Oil | 18.4 | 19.6% |
| Triethylamine | 4.5 | 4.8% |
| Oleic Acid | 1.5 | 1.6% |
| Trimethylolpropane Triacrylate | 3.2 | 3.4% |
| Carnauba Wax | 1.1 | 1.2% |
| Beeswax | 1.7 | 1.8% |
| Cedarwood Oil | 3 | 3.2% |

-continued

| Example 14 Composition | | |
|---|---|---|
| Component | Parts by Weight | % By Weight[1] |
| Hydrogen Peroxide[2] | 7.2 | 7.7% |
| Water | 52.8 | 56.3% |
| Chitosan | 0.4 | 0.4% |

[1]Total may not add to 100% due to rounding.
[2]Water and hydrogen peroxide provided as a 12% hydrogen peroxide solution in water.

A 100% cotton, poplin weave fabric weighing 144 gsm is immersed into the coating composition at room temperature, followed by padding the wetted fabric and wringing out excess fluid. The wetted and wrung fabric is coated with approximately 142 gsm of the coating composition. The wetted fabric is then cured in air at 149° C. for fifteen minutes to produce a dyed fabric. The approximate weight of the cured coating is 62 gsm. The coated fabric is evaluated using the AATCC Spray Test as before, with results as indicated in Table 14.

TABLE 14

| AATCC 22 Spray Test Results, Example 14 | | |
|---|---|---|
| Number Wash/ Dry Cycles | Water Weight Gained, g | Rating |
| 0 | 0.050 | 100 |
| 5 | 0.052 | 100 |
| 10 | 0.044 | 100 |
| 15 | 0.092 | 100 |
| 20 | 0.082 | 100 |

Excellent hydrophobicity is obtained.

EXAMPLE 15

Coating Composition Example 15 is prepared in the same general manner as described in Example 1. The overall composition is as follows:

| Example 15 Composition | | |
|---|---|---|
| Component | Parts by Weight | % By Weight[1] |
| Tung Oil | 9.0 | 15.0% |
| Triethylamine | 3.0 | 5.0% |
| Trimethylolpropane triacrylate | 2.1 | 3.5% |
| Carnauba Wax | 0.4 | 0.7% |
| Beeswax | 0.7 | 1.2% |
| Emulsifying Wax[2] | 0.25 | 0.4% |
| Cedarwood Oil | 1 | 1.7% |
| Benzoyl Peroxide | 0.4 | 0.7% |
| Water | 40.1 | 66.9% |
| Fumed Silica | 0.6 | 1.0% |

[1]Total may not add to 100% due to rounding.
[2]A mixture of vegetable wax, cetostearic alcohol and nonionic surfactant.

A knit 66% Lyocell®, 27% wool, 7% polyamide fabric weighing 301 gsm is immersed into the coating composition at room temperature, followed by padding the wetted fabric and wringing out excess fluid. The wetted and wrung fabric is coated with approximately 345 gsm of the coating composition. The wetted fabric is then cured in air at 149° C. for fifteen minutes to produce a dyed fabric. The approximate weight of the cured coating is 82 gsm. The coated fabric is evaluated using the AATCC Spray Test as before, with results as indicated in Table 15.

TABLE 15

| AATCC 22 Spray Test Results, Example 15 | | |
|---|---|---|
| Number Wash/ Dry Cycles | Water Weight Gained, g | Rating |
| 0 | 0.058 | 100 |
| 5 | 0.138 | 95 |
| 10 | 0.198 | 90 |

Excellent hydrophobicity is obtained once again.

EXAMPLE 16

70 parts of a 3% hydrogen peroxide solution in water, 0.41 parts of potassium alum and 0.91 parts of fumed silica are combined to produce an aqueous phase. Separately, 7 parts of tung oil, 3 parts of triethylamine, 0.52 parts of oleic acid, 1 part of trimethylolpropane triacrylate and 1 part of cedarwood oil are combined, heated to 75° C., followed by adding 3.8 parts of white beeswax and 0.84 parts of carnauba wax that has been pre-heated to 85° C. The aqueous and organic phases are combined at 75° C. with stirring to produce an emulsion. The overall composition is as follows:

| Example 16 Composition | | |
|---|---|---|
| Component | Parts by Weight | % By Weight[1] |
| Tung Oil | 7.0 | 7.9% |
| Triethylamine | 3.0 | 3.4% |
| Trimethylolpropane Triacrylate | 1.0 | 1.1% |
| Carnauba Wax | 0.84 | 0.1% |
| Beeswax | 3.8 | 4.3% |
| Cedarwood Oil | 1.0 | 1.1% |
| Oleic Acid | 0.52 | 0.6% |
| Hydrogen Peroxide | 2.1 | 2.4% |
| Water | 67.9 | 76.7% |
| Fumed Silica | 0.91 | 1.0% |
| Potassium Alum | 0.41 | 0.5% |

[1]Total may not add to 100% due to rounding.

Knit, grey-dyed 100% polyester (53 gsm) and knit, black-dyed polyester, 100% recycled, white-dyed polyamide (115 gsm) and black-dyed 90%/10% polyamide-elastane interlock knit fabrics (330 gsm) are coated with Coating Composition Example 16, in the same general manner as described in Example 3. In each case, the coating composition is padded onto the fabric at room temperature, followed by squeezing out the wetted fabric to remove excess fluid. The wetted fabric is then cured in air at 127° C. for 15 minutes to produce a dyed fabric. The approximate weight of the cured coatings are 24 gsm for the grey polyester fabric, 18 gsm for the black polyester fabric, 11 gsm for the white polyamide fabric and 43 gsm for the polyamide-elastane fabric.

The coated fabric is evaluated using the AATCC Spray Test as before, with results as indicated in Table 16.

TABLE 16

| AATCC 22 Spray Test Results, Example 16 | | |
|---|---|---|
| Fabric | Number Wash/ Dry Cycles | Water Weight Gained, g | Rating |
| Grey Polyester | 0 | 0.209 | 90 |
| GreyPolyester | 5 | 0.036 | 100 |
| Grey Polyester | 10 | 0.018 | 100 |
| Grey Polyester | 15 | 0.034 | 100 |

TABLE 16-continued

| AATCC 22 Spray Test Results, Example 16 | | | |
|---|---|---|---|
| Fabric | Number Wash/ Dry Cycles | Water Weight Gained, g | Rating |
| Black Polyester | 0 | 0.050 | 100 |
| Black Polyester | 5 | 0.010 | 100 |
| Black Polyester | 15 | 0.014 | 100 |
| White Polyamide | 0 | 0.089 | 100 |
| White Polyamide | 5 | 0.055 | 100 |
| White Polyamide | 10 | 0.041 | 100 |
| White Polyamide | 15 | 0.050 | 100 |
| Polyamide-Elastane Blend | 0 | 0.103 | 100 |
| Polyamide-Elastane Blend | 5 | 0.039 | 100 |
| Polyamide-Elastane Blend | 10 | 0.043 | 100 |
| Polyamide-Elastane Blend | 15 | 0.37 | 100 |

Excellent hydrophobicity is obtained once again, this time on previously-dyed fabrics.

EXAMPLE 17

65 parts of a 3% hydrogen peroxide solution in water, 10 parts of an 4% aqueous acetic acid solution, and 0.36 parts of potassium alum and combined and heated to 60° C. 0.32 parts of Best Acid Supra red-SF-P3BW red dye are dissolved into the aqueous phase, followed by and 0.91 parts of fumed silica. Separately, 7.1 parts of tung oil, 4 parts of triethyl-amine, 0.5 parts of oleic acid, 1 part of trimethylolpropane triacrylate and 1 part of cedarwood oil are combined, heated to 75° C., followed by adding 2.07 parts of white beeswax and 0.21 parts of carnauba wax that has been pre-heated to 85° C. The aqueous and organic phases are combined at 75° C. with stirring to produce an emulsion. The overall composition is as follows:

| Example 17 Composition | | |
|---|---|---|
| Component | Parts by Weight | % By Weight[1] |
| Tung Oil | 7.1 | 8.2% |
| Triethylamine | 4.0 | 4.6% |
| Trimethylolpropane Triacrylate | 1.0 | 1.1% |
| Carnauba Wax | 0.21 | 0.2% |
| Beeswax | 2.1 | 2.4% |
| Cedarwood Oil | 1.0 | 1.1% |
| Oleic Acid | 0.5 | 0.6% |
| Hydrogen Peroxide | 1.95 | 2.2% |
| Acetic Acid | 0.4 | 0.5% |
| Water[2] | 72.65 | 83.5% |
| Red Acid Dye | 0.3 | 0.3% |
| Fumed Silica | 0.91 | 1.0% |
| Potassium Alum | 0.36 | 0.4% |

[1]Total may not add to 100% due to rounding.
[2]Includes water added with the hydrogen peroxide and acetic acid solutions.

Undyed 90%/10% polyamide-elastane interlock knit (330 gsm), knit 100% recycled, undyed polyamide (115 gsm) and undyed 100% polyamide 2-way stretch (44 gsm) fabrics are coated with Coating Composition Example 17, in the same general manner as described in Example 16. In each case, the coating composition is padded onto the fabric at room temperature, followed by squeezing out the wetted fabric to remove excess fluid. The wetted fabric is then cured in air at 127° C. for 15 minutes to produce a dyed fabric. The approximate weights of the cured coatings are 34.4 gsm for the polyamide-elastane fabric, 9.5 gsm for the white poly-amide fabric and 5.6 gsm for the 2-way stretch fabric.

The coated fabric is evaluated using the AATCC Spray Test as before, with results as indicated in Table 17.

TABLE 17

| Fabric | Number Wash/ Dry Cycles | Water Weight Gained, g | Rating |
|---|---|---|---|
| Polyamide-Elastane | 0 | 0.390 | 80 |
| Polyamide-Elastane | 5 | 0.050 | 100 |
| Polyamide-Elastane | 10 | 0.063 | 100 |
| Polyamide-Elastane | 15 | 0.050 | 100 |
| Recycled Polyamide | 0 | 0.147 | 90 |
| Recycled Polyamide | 5 | 0.059 | 100 |
| Recycled Polyamide | 10 | 0.047 | 100 |
| Recycled Polyamide | 15 | 0.032 | 100 |
| Polyamide | 0 | 0.088 | 100 |
| Polyamide | 5 | 0.024 | 100 |
| Polyamide | 10 | 0.015 | 100 |
| Polyamide | 15 | 0.012 | 100 |

What is claimed is:

1. A coating composition in the form of an emulsion comprising, based on the total weight of the liquid composition, a) 5 to 35 wt-% of a drying oil;

b) 0.25 to 5 wt.-% of a fatty acid or fatty alcohol component selected from the group consisting of fatty acids having at least 12 carbon atoms and 0 to 2 non-conjugated carbon-carbon double bonds, alkylamine fatty acids having in the fatty acid portion at least 12 carbon atoms and 0 to 2 non-conjugated carbon-carbon double bonds and fatty alcohols having at least 12 carbon atoms and 0 to 2 non-conjugated carbon-carbon double bonds;

c) 2 to 10 wt.-% of an alkylamine having a boiling temperature of 75 to 160° C., provided the amount of alkylamine is 0.2 to 1.25 parts by weight per part by weight of the drying oil;

d) 50 to 90 wt.-% water; and e) 0.25 to 7.5 wt.-% of a wax or a mixture of waxes, the wax or mixture of waxes having a melting temperature of at least 60° C.

2. The coating composition of claim 1 wherein a constituent fatty acid of the drying oil contains at least 2 conjugated carbon-carbon double bonds.

3. The coating composition of claim 2 wherein a constituent fatty acid of the drying oil contains at least 3 conjugated carbon-carbon double bonds.

4. The coating composition of claim 3 wherein at least 40% by weight of constituent fatty acids of the drying oil contain at least 3 conjugated carbon-carbon double bonds.

5. The coating composition of claim 1 wherein the drying oil is one or more of tung oil, bitter gourd oil, linseed oil and pot marigold seed oil.

6. The coating composition of claim 1 wherein the fatty acid or fatty alcohol component is a fatty acid selected from the group consisting of lauric acid, tridecylic acid, myristic acid, pentadecylic, palmitic acid, margaric acid, stearic acid, myristoleic acid, palmitoleic acid, vaccenic acid, oleic acid, elaidic acid, and mixtures of any two or more thereof.

7. The coating composition of claim 1 wherein the alkylamine is selected from the group consisting of triethyl amine, diisopropyl amine, triisopropyl amine, tri-n-propyl amine, mono-n-butyl amine, di-n-butyl amine and monocyclohexyl amine.

8. The coating composition of claim 1 further comprising f) 0.25 to 10% by weight of the coating composition of a crosslinking monomer, which is not a fatty acid or alkylamine fatty acid, the crosslinking monomer containing at least two carbon-carbon double bonds and having up to 20 carbon atoms.

9. The coating composition of claim 1 wherein the crosslinking monomer contains 2 or more acrylate groups.

10. The coating composition of claim 1 wherein the wax is selected from the group consisting of carnauba wax, paraffin wax, rice bran wax, soy wax, mixtures of soy wax and palm wax, beeswax and a mixture of any two or more of the foregoing.

11. The coating composition of claim 1 further comprising g) at least one oxidizer selected from the group of peroxy, azo, perborate, persulfate and perchlorate compounds.

12. The coating composition of claim 11 wherein the oxidizer is one or more of hydrogen peroxide, benzoyl peroxide, lauroyl peroxide, tertiary butyl peroxide, ammonium perchlorate, ammonium perborate, alkali metal perchlorate and alkali metal perborate.

13. The coating composition of claim 1 further comprising i) an organic dye or ii) a colorized pigment.

14. The coating composition of claim 13 wherein the organic dye comprises a reactive dye, an acid dye, a disperse dye, or a mixture of any two or more thereof.

15. The coating composition of claim 1 further comprising j) a silicone oil.

16. The coating composition of claim 1 further comprising k) 0.1 to 5% by weight, based on the weight of the coating composition, of at least one terpene and/or terpenoid compound having 10 to 20 carbon atoms.

17. The coating composition of claim 1 further comprising l) 0.01 to 2% by weight, based on the weight of the coating composition of one or more of tannic acid, oxalic acid, alum (potassium alum), ammonium alum, sodium (soda) alum, chrome alum and sodium chloride.

18. The coating composition of claim 1 further comprising a plant essential oil that contains at least 25% by weight of one or more terpenes and/or terpenoid compounds having 10 to 20 carbon atoms.

19. The coating composition of claim 1 further comprising cedarwood oil, eucalyptus oil, pine oil or a mixture of any two or more thereof.

20. A process for applying a durable water-repellent finish to a fabric, comprising the steps of (a) applying a coating composition of claim 1 to a fabric and (b) curing the applied coating composition in air at a temperature of 100 to 160° C. to produce the durable water-repellent finish.

\* \* \* \* \*